Aug. 20, 1935.　　A. B. PALMER ET AL　　2,012,138
METHOD AND APPARATUS FOR ORIENTING WHIPSTOCKS
Filed Nov. 28, 1933　　4 Sheets-Sheet 1
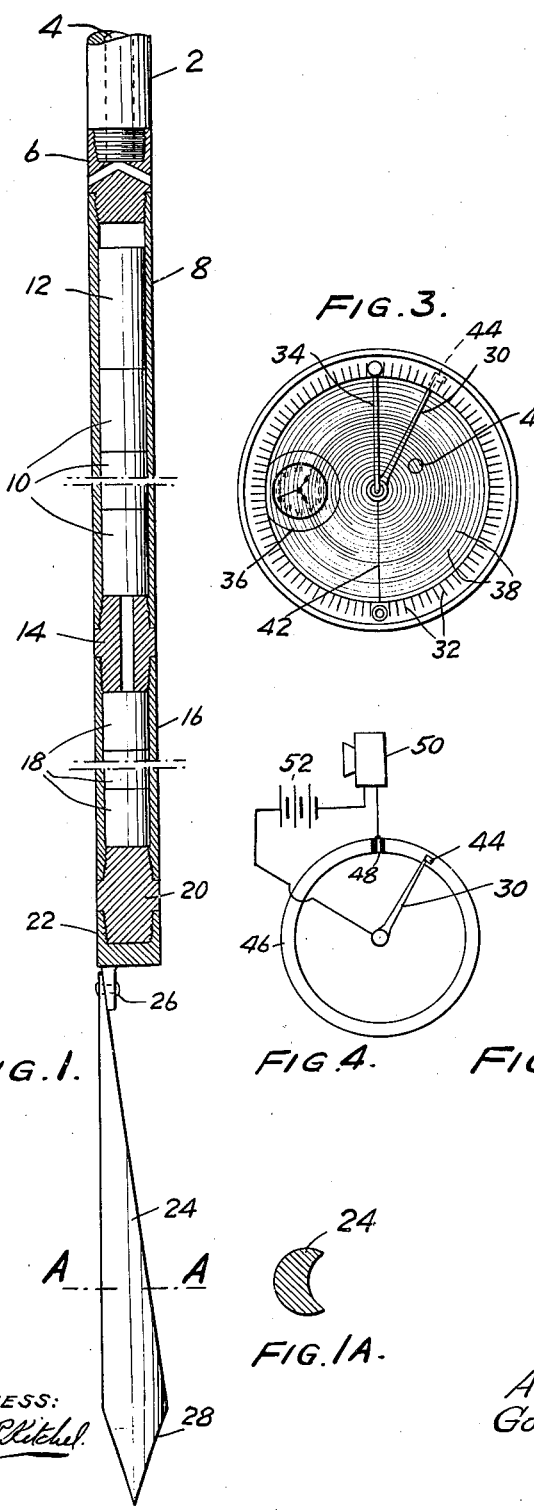
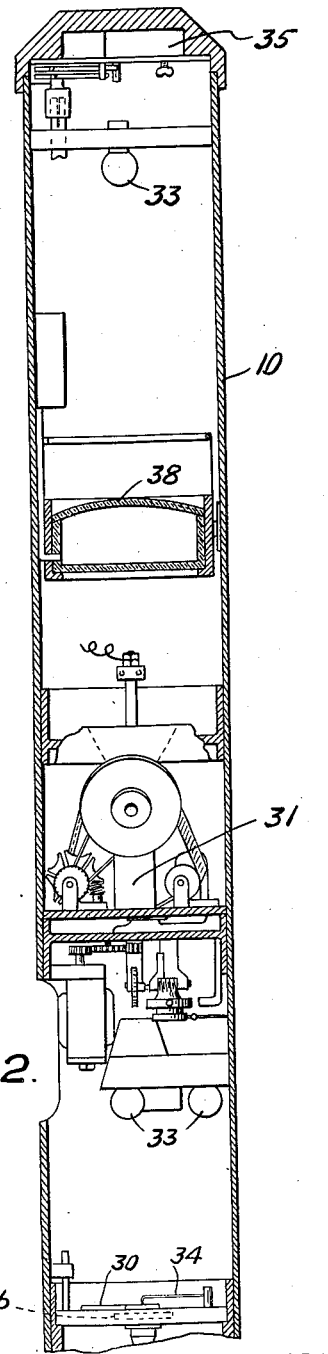
INVENTORS
Arthur B. Palmer and
Gottdank L. Kothny
BY Busser & Harding
ATTORNEYS.
WITNESS:

Aug. 20, 1935.  A. B. PALMER ET AL  2,012,138
METHOD AND APPARATUS FOR ORIENTING WHIPSTOCKS
Filed Nov. 28, 1933  4 Sheets-Sheet 2
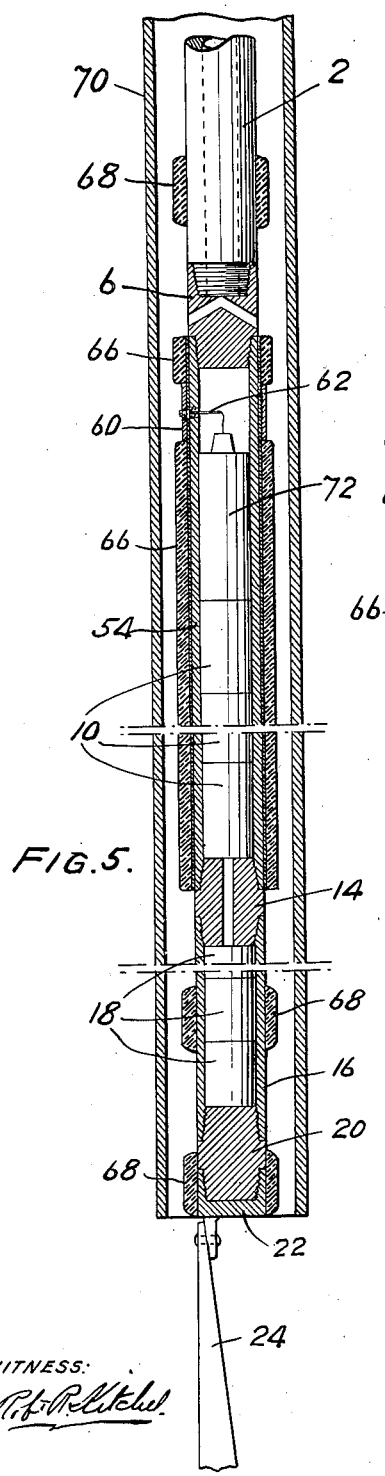
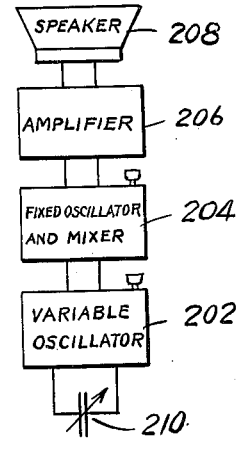
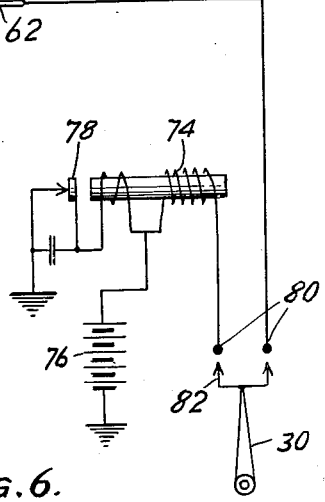
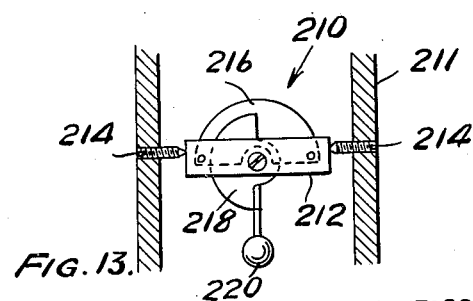

Aug. 20, 1935.   A. B. PALMER ET AL   2,012,138
METHOD AND APPARATUS FOR ORIENTING WHIPSTOCKS
Filed Nov. 28, 1933   4 Sheets-Sheet 3
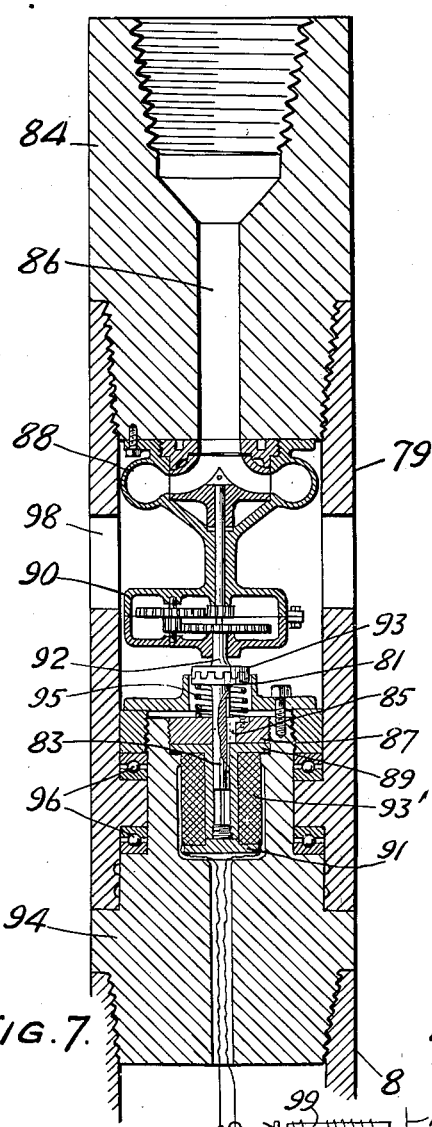
FIG. 7.
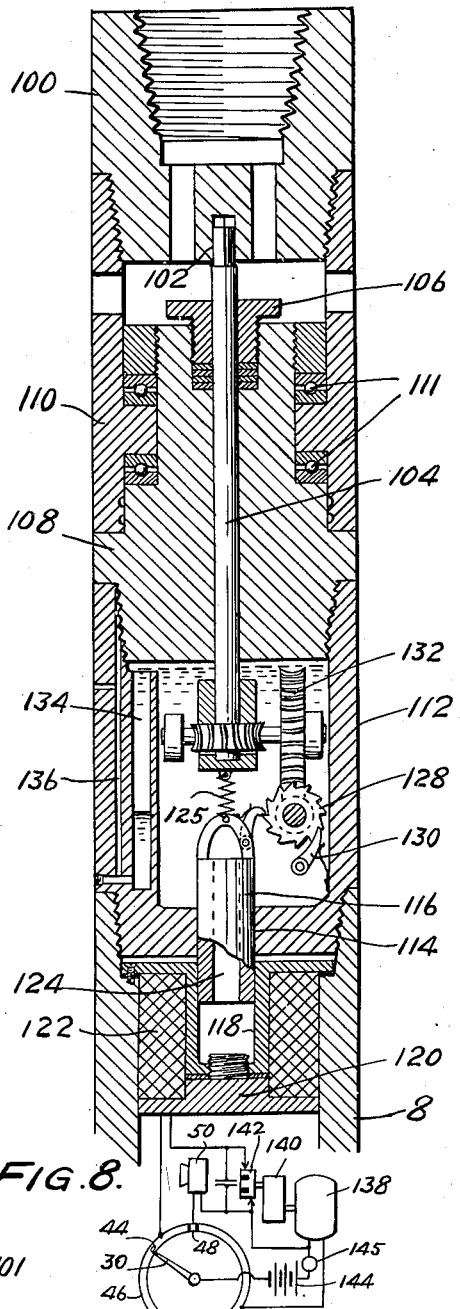
FIG. 8.
WITNESS:
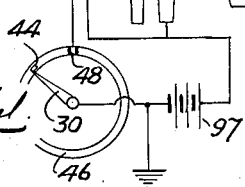
INVENTORS
Arthur B. Palmer and
Gottdank L. Kothny
BY
Busser & Harding
ATTORNEYS.

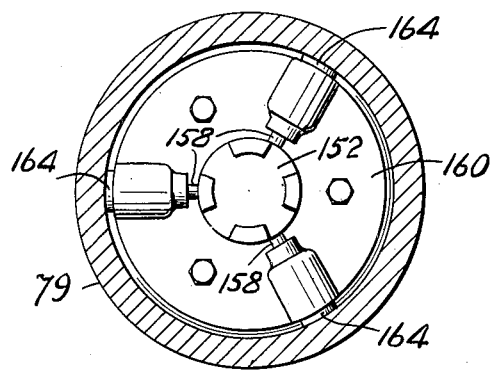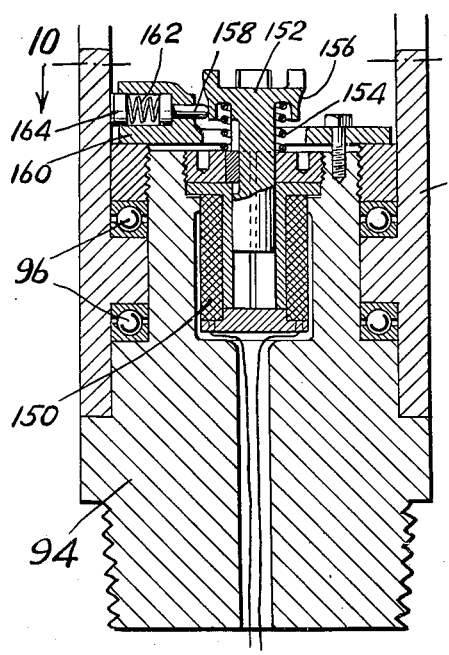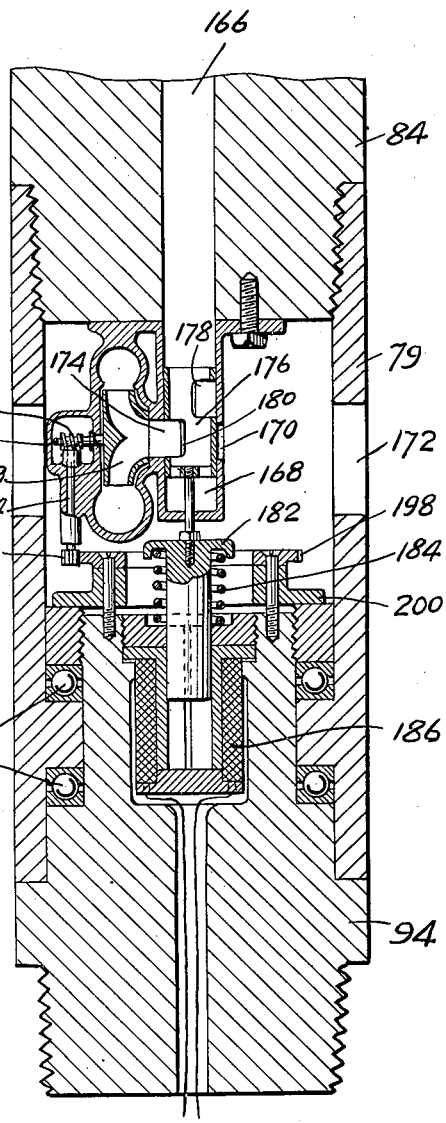

Patented Aug. 20, 1935

2,012,138

UNITED STATES PATENT OFFICE 2,012,138

METHOD AND APPARATUS FOR ORIENTING WHIPSTOCKS

Arthur B. Palmer, Dallas, Tex., and Gottdank L. Kothny, Strafford, Pa., assignors to Sperry-Sun Well Surveying Company, Philadelphia, Pa., a corporation of Delaware Application November 28, 1933, Serial No. 700,096

33 Claims. (Cl. 255—1)

This invention relates to the drilling of bore holes and more specifically to the orientation of whipstocks for directing a drilling tool in a predetermined direction following the partial drilling of a hole.

It frequently happens in the drilling of a bore hole, particularly by the rotary method, that considerable deviation from the vertical takes place. In certain instances, this deviation is of such a serious nature as would cause the bore hole to entirely miss the strata for which it was aimed. Accordingly, when it is found by a survey that a bore hole has deviated from its proper course to a substantial degree, recourse is had to the use of a whipstock for deflecting the drilling tool in a proper direction to bring the lower end of the desired hole at the proper location. The whipstock consists merely of a length of metal adapted to be fixed in position in the bore hole and provided with a tapered face along which the tool may move so as to be deflected laterally of the hole.

It is sometimes desirable to use a whipstock to deflect a bore hole to cause it to reach an oil deposit when drilling cannot conveniently be started at the surface vertically above the deposit, as, for example, if the deposit should happen to be directly under a hill. In such cases considerable drilling may be avoided by drilling vertically for some distance at one side of the hill and then deflecting the drill in the desired direction by means of a whipstock. This method is also usable when drilling towards a location covered by surface water.

It is, of course, necessary that the whipstock be so set as to cause a deflection of the drilling tool in the proper direction. Various methods have been evolved for properly locating the whipstock, a typical one being described in the transactions of the Institute of Mining and Metallurgy (1911–1912, pages 481 to 489). The methods such as that described in this publication are comparatively difficult to carry out and are not likely to lead to an accurate positioning of the whipstock. In fact, all of them necessarily require a check to be made of the position of the whipstock before drilling is resumed, since so many accidents may occur in setting the whipstock that there can be no assurance without such check that the drilling will thereafter take place in the proper direction. In any case, a satisfactory check of the position of the whipstock may only be made by the use of a gyroscopic instrument whose indications of orientation are independent of the presence of magnetic materials, such as the casing of the well or magnetic ores in the vicinity. Carrying out any of the known processes, however, is quite difficult by reason of the various manipulations involved.

It is the object of the present invention to provide a method of orienting a whipstock in which the proper positioning of the whipstock may be definitely ascertained at the time it is fixed in position. The attainment of the proper location is preferably indicated by a suitable signal at the surface.

A further object of the invention is to automatically orient the whipstock in the desired direction and hold it in this direction while setting it. This is preferably done by hydraulic or electrical means.

The objects of the invention will best be made clear from a consideration of the following description in conjunction with the accompanying drawings, in which:

Fig. 1 is a diagrammatic elevation partly in section showing the assembly of a drill stem, well surveying instrument, whipstock, and other elements prior to setting;

Fig. 1A is a section on line A—A of Fig. 1;

Fig. 2 is a sectional view through the gyroscopic well surveying instrument used in carrying out the invention;

Fig. 3 is a view showing the type of record made by the well surveying instrument;

Fig. 4 is a wiring diagram illustrating the apparatus employed to give an indication at the surface of the proper setting of the whipstock;

Fig. 5 is a sectional view showing a modified form of apparatus;

Fig. 6 is a diagrammatic view showing constructional details of the last apparatus, and also a wiring diagram therefor;

Fig. 7 is a sectional view showing means for rotating a whipstock and certain adjacent elements by surface control without rotating the drill stem and means for automatically stopping the whipstock in its proper position;

Fig. 8 is a sectional view showing means for automatically locating the whipstock in proper position.

Fig. 9 is a sectional view showing means for automatically locking the whipstock in a proper position;

Fig. 10 is a transverse section on the plane indicated at 10—10 in Fig. 9;

Fig. 11 is a sectional view showing hydraulic means for automatically locating the whipstock in proper position and locking it;

Fig. 12 is a diagrammatic view showing an alternative means of indicating proper whipstock setting; and Fig. 13 is a vertical section showing a detail of apparatus used in the modification of Fig. 12.

Referring first to the modification of the invention illustrated in Figs. 1 to 4, inclusive, there is indicated at 2 the lowermost section of a drill stem formed of pipe sections having openings 4 therethrough for the passage of mud, to which is secured by means of a coupling 6 the casing 8 containing a well surveying instrument, composed of sections 10, and an apparatus located within the inner casing 12. To the lower end of the surveying instrument casing 8 there is connected by means of a coupling 14, a battery protective casing 16 containing suitable batteries 18 for the purpose of supplying power for the operation of the well surveying instrument and indicating means. A sub 20 closes the lower end of the battery casing and couples it with a setting tool 22 provided with a downwardly extending extension to which is secured a whipstock 24 by means of a soft metal rivet or bolt 26.

The whipstock 24 may be of any conventional type provided with a guiding surface as indicated in Fig. 1A of suitable type to deflect a drill. It is illustrated in the present instance as provided with a chisel shaped lower end 28 designed to be forced into the soil at the bottom of the bore hole to thereby hold the whipstock in position. It will be obvious, of course, that other well known types of whipstocks may be used which are secured either directly in the bore hole or in the interior of a casing in other fashions; for example, within a casing at the joints thereof.

The gyroscopic well surveying instrument which is illustrated and which is preferably used because of the accuracy of its indications, is of the type illustrated in the application of Williston and Nichols, Ser. No. 400,479, filed October 18, 1929 matured into Patent No. 1,960,038, granted May 22, 1934. This instrument photographically records the position of a gyroscope and a bubble at intervals of time corresponding to relatively short distances along the path of a bore hole. The details of the instrument are diagrammatically illustrated in Fig. 2. A pointer 30 is carried by the vertical gimbal ring of a gyroscope and moves adjacent a scale 32 indicated in Fig. 3. A lead 34 conducts current to the gyroscope and may serve as an indication of the zero of the scale 32, which may, however, be suitably marked in any desired manner to indicate an origin of reference.

A camera 31 is designed to photograph the pointer 30 and scale 32 as well as a timepiece 36 located adjacent the same. The camera also simultaneously photographs a box level 38 located above it and provided with a bubble 40, whose position relative to annular lines inscribed on the surface of the level serves to indicate the inclination of the instrument. In accordance with the present invention the use of the level is not essential although it is desirable to obtain a check of the inclination of the bore hole at the position where the whipstock is being set. Lamps 33 serve to illuminate the various instruments for the production of exposures.

In order that an excessive number of exposures shall not be made, the current to the camera motor and the lamps 33 is preferably controlled by means indicated at 35 and described fully in the application of G. L. Kothny, Ser. No. 474,687, filed August 12, 1930. This apparatus merely serves to lengthen the intervals between successive exposures and thus prevent excessive drain upon the batteries 18. The gyroscope, of course, must be kept running continuously at full speed throughout the operation.

In accordance with this modification of the present invention, there is included within the casing containing the surveying instrument an additional apparatus indicated at 12. This comprises a suitable device for making a loud sound, and in its simplest form may consist of a conventional electrically operated automobile horn. This is wired, as indicated in Fig. 4. The gyroscope pointer 30 carries a very light brush 44 moving in contact with an arcuate metallic ring 46 in which is inserted a short, insulated conducting segment 48. The brush and ring 46 may be located below the scale 32, as indicated at the upper portion of Fig. 3. A battery 52 is connected in a circuit as shown. The portion 46 of the ring in the present modification is not used and, in fact, may be omitted, so that the brush 44 is not required to contact with anything during the greater part of its movement. The connections are such, however, that the gyroscope pointer and brush 44 will complete an electrical circuit through the horn 50 when the brush contacts with the small conducting segment 48.

In setting a whipstock in accordance with this modification, the assembly is made up as indicated in Fig. 1. Either the lead 34 or a line 42 inscribed on the surface of the box level is brought into a known relationship with the tapered face of the whipstock 24; for example, pointing in the direction in which the whipstock will deflect a drill. The segment 48 is made to bear a relationship with the mark 42 or lead 34, this relationship being such that when the whipstock is facing in the proper direction contact will be made at 48 and the horn sounded.

In carrying out the method, the assembly as indicated above is lowered within the bore hole to the desired depth, the surveying instrument operating in the usual fashion. No care need be exercised in determining whether the various drill stem sections are lined up with each other so that lowering may be accomplished as rapidly as the sections may be secured together. When the proper depth is reached, the drill stem is slowly turned while an observer at the surface holds a stethoscope or a microphone, connected to a suitable amplifier, against the upper end of the drill stem.

The type of apparatus used at the surface depends entirely on the intensity of the sound which may be generated within the instrument and the length of stem which produces an attenuation. The turning is continued until the sound of the apparatus 50 is heard. If any overrunning occurs, the drill stem may be turned slightly in the reverse direction until the sound is continuous. When this position is found, it is known definitely that the whipstock is facing in the proper direction, since obviously no substantial twist can occur in the short length of the apparatus between the surveying instrument and the whipstock. The whipstock is then fixed in that fashion which corresponds to its construction, which, in the case of the type illustrated, would involve penetration into the soil at the bottom of the hole, following which the drill stem is moved slightly downwardly to shear off the rivet 26, and the drill stem, together with the surveying apparatus, is lifted to the surface, whereupon the gyroscope may be examined to determine whether any drift occurred, and the records may be developed, giving a definite indication and record of the position of the whipstock. The simplicity of the operation involved will be obvious when it is considered that a photographic check is made of the position of the whipstock in the operation involving its setting without paying any attention to the alignment of the drill stem sections and without any connection, electrical or otherwise, to the surface, except that of the drill stem itself.

Instead of utilizing the conduction of sound along the drill stem to indicate the proper positioning of the whipstock, other means of indication may be employed. Figs. 5 and 6 illustrate an alternative arrangement. In this case, the assembly is similar to that illustrated in Fig. 1, except that the casing 8 of the surveying instrument is replaced by a casing 54 which is arranged to be insulated from the walls of the bore hole, or a casing therein indicated at 70. In this instance, an insulating plug, indicated at 56, is threaded into the wall of the casing, as illustrated most clearly in Fig. 6. The outer surface of this is made flush with the casing and the entire casing coated with hard rubber to provide insulation, as indicated at 58. About this hard rubber exteriorly of the plug there is located a metallic ring, indicated at 60, provided with a tapped opening into which projects the outer end of a steel pin 62 threaded into a drilled and tapped hole in the plug 56 and cemented therein to prevent any possible passage of fluid from the bore hole into the casing 54. A plug 64 tapped into the opening in the electrode ring bears against the pin 62 to make an electrical connection. Above the ring 60 there is provided a cushion 66 of a soft wear-resisting rubber similar to that used for the manufacture of vehicle tires. The rest of the apparatus, including the entire drill stem, is prevented from contacting with the walls of the bore hole or the casing 70 by having fitted thereon rubber protectors of the well known type designed to prevent rubbing of the casing by a rotating drill. These protectors, in the present instance, function not for the prevention of abrasion, but as electrical insulators.

Above the surveying apparatus, of the type indicated in Fig. 2, there is located a housing 72 containing a spark coil, indicated at 74, adapted to be actuated by a suitable battery 76 and having the current in the primary interrupted in the conventional fashion by a breaker, illustrated at 78. One end of the secondary of the spark coil is grounded, the other end being connected to one of a pair of electrodes 80, the other electrode, spaced from the first, being connected to the pin 62, these various leads from the ungrounded side of the secondary of the coil being carefully insulated in view of the high voltage which they are required to carry. The electrodes 80 are so spaced that when the spark coil is operating, no spark can jump from one to the other. The gap is at proper times sufficiently shortened to permit sparks to pass by providing on the end of the pointer 30 of the gyroscope a plurality of connected electrode points 82 designed to move simultaneously into proximity with the respective electrodes 80. These electrodes 80 correspond in position to the segment 48 of the previously described modification, so that, when the whipstock is set in the desired position, a shortening of the gap sufficient to permit the passage of a spark is provided.

By reason of the connections which are illustrated, it will be seen that when the gyroscope pointer is in proper relationship to the electrodes 80, sparks will pass across the shortened gaps and also possibly between the ring 60 and the walls of the well casing or bore hole. At any rate, the atmosphere outside the ring 60 will be to such extent ionized or the electrostatic capacity between the ring 60 and the casing such that a difference of voltage will be produced between the upper end of the drill stem and the earth. A phone connected between the drill stem and ground will accordingly be subjected to sufficient voltage to indicate by buzzing the proximity of the points 80 and 82 and accordingly the proper positioning of the whipstock. The setting is carried out precisely in the same fashion as in the other modification, with merely the difference in the mode of indicating the proper setting.

If the bore hole contains mud, which can scarcely be prevented at the lower end where the whipstock is being set, the apparatus will nevertheless function, since the electrode 60 is held spaced to a substantial extent from the nearest ground. Current will flow in paths diverging from the ring 60 and even though the voltage differences at the surface are small, a sensitive phone, or an amplifier connected with the phone, will indicate the passage of sparks between 80 and 82 and completion of an electrical circuit thereto. It may be noted that this arrangement avoids the necessity for having the gyroscope pointer carry any brush contacting with a conductor and thereby imposing any restraining torque on the movement of the vertical gimbal ring. This, however, is not a serious objection to the apparatus of the first modification, since the brush may take the form of an extremely light wire and the drift in a gyroscope occasioned by reason of the friction involved will be entirely negligible.

In both of the modifications so far described, adjustment of the whipstock must be made by turning the drill stem at the surface. In view of friction, particularly if the bore hole is quite crooked, the lower end of the drill stem will resist turning with the upper end and when sufficient torque is applied at the upper end to initiate turning, the lower end may snap past its proper position. Difficulty is thus experienced in locating the whipstock accurately to a high degree of precision. This may be avoided by utilizing the arrangements illustrated in Figs. 7 and 8.

In the former of these arrangements, the apparatus disclosed in Fig. 7 is interposed between the lowermost section of the drill stem 2 and the surveying instrument housing, taking the place of the coupling 6.

In this modification, an indicating means generally similar to that shown in Figs. 5 and 6, is employed, although the coil in the present instance is not continuously actuated, thus saving electrical energy. It will be obvious hereafter that the indicating means of Fig. 4 may be employed just as satisfactorily.

The lower end of the drill stem 2 is connected to a coupling member, indicated at 84, provided with a mud passage, indicated at 86, and communicating with the inlet of a mud turbine of any suitable type, indicated at 88.

The shaft of this turbine is connected, through suitable reduction gearing, shown at 90, with a shaft 92 which carries one member 93 of a clutch. The other member, 81, of the clutch is supported by a plunger 83 of magnetic material forming the armature of a plunger type electromagnet. The plunger 83 is provided with a key-way receiving a key 85 secured in a plug 87, which presses upon and holds in fluid-tight engagement with a coupling 94 a cup 89 set into an opening within the coupling 94, the plug 87 being threaded to the coupling 94. The cup 89, the body of which is formed of brass or some other nonmagnetic material, is closed at its lower end by means of a magnetic cap, indicated at 91. The cylindrical portion of the cup 89 is wound, as indicated at 93', to provide an electromagnet designed to pull the plunger 83 downwardly against the tension of the spring 95, which normally urges it upwardly to cause the two clutch members to engage. The housing 79 which encloses the mud turbine and reduction gearing is provided with exit openings 98 for the mud and is swivelled, as indicated at 96, to the coupling member 94 which closes the upper end of the protective casing 8 of the well surveying instrument. It will be noted that the cup 89 and its bottom closure 91 close the central opening through the coupling 94 so as to prevent any entrance of mud into the surveying instrument casing. The inner walls of the cylindrical portion of 89 are suitably grooved to permit the upward displacement of mud therefrom as the plunger 83 is pulled downwardly.

Within the surveying instrument casing is located a brush and contact arrangement of the type indicated in Fig. 4, including a ring 46, which in the present instance is inactive, and an insulated conducting segment 48 adapted to be engaged by the brush 44 carried by the gyroscope pointer 30. A battery 97 is in series with the gyroscope pointer, the solenoid 93' and the segment 48, so that when the brush 44 contacts with the segment the electromagnet will be energized, disengaging the clutch. In parallel with this arrangement, there is provided a spark coil 99, the high tension lead 101 of the secondary of which is connected in the same fashion as indicated in the modification of Figs. 5 and 6 to a conducting ring, so as to provide an indication of the attainment by the whipstock of the desired position.

In the operation of the device, after the whipstock is brought to the proper level, mud is pumped into the drill stem, serving to drive the turbine 88 and through the clutch the surveying instrument and whipstock. Since the flow of mud cannot be controlled with extreme accuracy, the clutch arrangement is provided to cause a disengagement of the surveying instrument and whipstock from the turbine when they attain their proper position. Even though the flow of mud should be continued for a considerable period, the position of the whipstock will not be disturbed. The fact that the whipstock has attained its proper position is signalled to the surface in the same fashion as in the modification of Figs. 5 and 6. It will be obvious, of course, that the proper position may be signalled in some other fashion, as by the use of the arrangement of Fig. 4.

The apparatus just described provides for an accurate setting of the whipstock but requires surface connection to a supply of mud, although the clutch removes the necessity for any fine adjustment of control. The necessity for all surface control may be eliminated and accurate setting effected automatically by the use of the apparatus illustrated in Fig. 8. This apparatus, like that of Fig. 7, takes the place of the coupling 6 between the lowermost section of the drill stem and the surveying instrument 8. A coupling member 100 is provided having suitable mud passages therein if it is desired to provide a mud flow, although this is not necessary for the operation of the device, and has a square socket 102 receiving the squared upper end of a shaft 104 which passes through an opening in a plug 108 and is packed therein by a suitable arrangement, indicated at 106. The plug 108 is swivelled, as indicated at 111, to the connecting member 110 secured to the coupling 100.

A housing 112 is tightly connected to the plug 108 and is provided at its lower end with a closing wall having an opening 114 therein acting as a guide for the plunger armature 116, which is designed to be received within an opening provided in a cap 118 for the surveying instrument protective casing 8. The cap 118 is made of nonmagnetic material and the cylindrical opening therein is closed by a steel plug 120, it being understood that the protective casing 8 and the housing 112 are of steel or other magnetic material. A winding 122 on the outside of the cylindrical portion of the cap 118 accordingly provides, together with the plunger 116, a plunger type electromagnet, the exterior magnetic flux having a complete circuit through the plug 120, the casing 8, the bottom of the housing 112, and the plunger 116. When current flows through the solenoid 122, the plunger is pulled downwardly against the tension of its supporting spring 125. An opening 124 through the plunger permits fluid freedom of passage from above it to below it, and vice versa. At its upper end, the plunger 116 carries a pawl 126 arranged to actuate a ratchet 128 as the plunger moves downwardly, reverse movement of the ratchet being prevented by a suitable detent 130. The ratchet, through reduction gearing 132, drives the shaft 104, the amount of reduction being preferably very great so that the shaft 104 may be caused to exert a very large torque irrespective of quite small pull upon the plunger 116. This is desirable, inasmuch as, although special batteries may be provided for actuating the plunger, their size should be kept to a minimum with the current drain thereon as small as possible.

Within the housing of the surveying instrument there is provided a motor 138 which, through suitable reduction gearing 140, serves to drive a commutator 142 at a suitable speed which will permit the plunger to reciprocate at a proper frequency. The circuit arrangement is as illustrated, the gyroscope pointer carrying the brush 44, as in Fig. 4, in contact with the metallic ring 46 and insulated segment 48, which, as in the previous modification, is connected to a sound producing device such as a horn 50. The power for the operation of the plunger 116, the motor 138, and the horn 50 may be provided by a single set of batteries, indicated at 144, and included in the battery housing. Utilizing the wiring diagram as shown, it will be seen that the motor 138 will be driven and the plunger 116 caused to reciprocate by the alternate making and breaking of the circuit through the solenoid 122 until the brush 44 leaves contact with the discontinuous ring 46. As such contact is broken, the circuit through the sound producing device 50 is closed and accordingly the attainment of proper position by the whipstock is made audible at the surface.

A timing device 145 in the nature of an electric switch controlled by clockwork is provided in the circuit as indicated for the purpose of starting the apparatus when the whipstock is lowered to its proper position and stopping it after the whipstock is set, thus avoiding unnecessary drain upon the special battery 144 when the apparatus is being lowered into and withdrawn from the hole. The attainment of proper position by the whipstock is indicated at the surface by the sounding of the horn 50, which indicates that the plunger 116 operating through the reduction gearing has brought the whipstock to proper position. The whipstock may then be secured in the usual fashion and released from the drill stem and the remaining apparatus brought to the surface, a photographic record checking the position of the whipstock being automatically secured.

If the bore hole contains mud, it is desirable to keep mud out of the housing 112. This may be effected by filling the housing with oil and providing a well 134 initially filled with oil but into which mud may pass to some extent through a small passage indicated at 136. In this way, as greater depths are reached and the mud pressure increases, causing compression of residual air, for example, the mud may rise to some extent in the well 134 but will not entirely displace the oil therein so that the operating parts of the apparatus remain within the oil and are not likely to be destroyed by the mud. It will be noted that at this time the pressures on the two sides of the stuffing box 106 will be the same, so that there is no tendency to cause leakage at this point.

To prevent accidental rotation of the whipstock after it has been oriented means may be provided for locking the whipstock to the drill stem. Such locking means is desirable, since certain of the methods of fixing the whipstock in position require the application of considerable forces upon the whipstock which might accidentally turn it if it is swivelled freely upon the drill stem. Under such conditions, locking means may be provided of the types indicated in Figs. 9, 10, and 11, the first two figures showing one locking arrangement and the last a somewhat different type of means for effecting the same purpose.

Referring first to Figs. 9 and 10, there is shown therein an arrangement in a general way similar to that illustrated in Fig. 7, in which rotation of the whipstock is effected by the operation of a mud-driven turbine through suitable reduction gearing and a disengageable clutch. The solenoid 150, which is similar to the solenoid 93 of Fig. 7 and is controlled in the same fashion, attracts as an armature a plunger 152 forming one member of a clutch similar to 81 of Fig. 7. The clutch member 152 is normally held upward towards its engaging position by the action of a spring 154. At its upper end it is provided with a tapered surface 156 arranged to act as a cam upon plungers 158, which are guided in cylinders formed in the plate 160, which is bolted to the member 94. Within the cylinders there are provided springs 162 which are adapted to press against shoes 164 faced with brake lining and adapted to engage the inner cylindrical wall of the element 79 of the assembly which is fixed with respect to the drill stem. In the operation of this device, when the clutch is engaged the members 158 occupy their inner positions, removing tension from the springs 162 so that the brake shoes 164 are ineffective to prevent substantially free rotation of the member 94 relative to the drill stem. As soon as the clutch is disengaged, however, by the pull of the solenoid 150, the members 158 are pressed outwardly by the action of the cam 156, compressing the springs 162 and thereby applying the brake shoes forcibly against the member 79. The whipstock is thereby locked in a fixed position relative to the drill stem so that it will not be accidentally displaced during its fixation into position in the bore-hole or casing.

In Fig. 11, there is illustrated an alternative arrangement for accomplishing similar results. In this case the arrangement of the mud-driven turbine is somewhat different from that illustrated in Fig. 7. The mud passage 166, which corresponds to the passage 86 of Fig. 7, discharges mud into a valve cylinder indicated at 168, in which there is provided a port 170 serving for the by-passing of the turbine and discharge through the opening 172 and also a second port 174, which serves to lead mud into the turbine. Controlling these ports there is a cylinder valve 176 having ports 178 and 180 suitably formed therein. The valve is connected to the plunger 182, which is pressed upwardly by the spring 184 to normally hold the valve in its upper position. The plunger 182 forms the armature of a solenoid 186 and may be pulled downwardly when the solenoid is energized as previously described. A turbine is provided comprising a runner 188 carried by a shaft 190 on which, in the present instance, there is secured a worm gear 192 meshing with a wheel carried by the upright shaft 194. This shaft drives the ring 200 through the coaction of pinion 196 with gear teeth 198 formed on said ring, the ring being secured to the member 94, which, as before, is secured fixedly to the whipstock.

In the operation of the arrangement of Fig. 11, as soon as the whipstock attains its proper orientation, the solenoid 186 is energized, attracting the plunger 182 and pulling the valve 176 downwardly. This produces a registry of the ports 178 and 170 so that any mud which may thereafter be pumped down through the drill stem passes outwardly through the port 172 by-passing the turbine. Communication with the turbine is simultaneously cut off by the closure of the port 174. When this occurs, the turbine rotor will immediately come to rest due to the liquid friction in the casing. Because of the worm and wheel arrangement, forces exerted on the whipstock are ineffective to turn the shaft 194 so that the whipstock is held in a fixed position relative to the drill stem. If, instead of the unilateral type of gearing which is used, pinions are used throughout, effective locking will nevertheless occur, since, because of the reduction, a very considerable force would have to be applied to the whipstock to cause it to rotate the turbine runner against the resistance caused by the mud in the housing.

In all the embodiments of the invention so far described, there has been involved the use of direction indicating means specifically taking the form of a gyroscope which controls the sound of a signal or automatically stops the rotation of the whipstock when the whipstock attains its proper position. A gyroscope is preferably used particularly because it reliably determines a fixed azimuth and photographic records may be made serving to indicate directly that the whipstock has been placed in its proper position. Magnetic means may, of course, be used, but they are generally unreliable due to disturbances resulting from the presence of magnetic bodies. In the present type of apparatus particularly magnetic instruments are undesirable because it is difficult to construct whipstock supporting apparatus which does not contain iron.

It is, however, possible to orient a whipstock in accordance with the present invention without using any means serving to directly indicate the azimuth. This may be made clear by a consideration of the following matters.

After an accurate survey of a bore-hole is made, there is known at any particular depth not only the amount of inclination but also the direction of such inclination. Differently stated, this means that the direction of the bore-hole at any point is known relative to some arbitrary references which, in general, would be a vertical line and the points of the compass. If, at a certain point under consideration, the bore-hole is not vertical, then the azimuthal position of an element at that point may be described in two ways. First, it may be referred directly to a fixed azimuth such as is determined by the use of a gyroscope at that point. It is this operation depending on the type of reference that has been used in the modifications of the invention heretofore mentioned.

We have, however, in any sloping part of a bore-hole, an azimuthal direction determined by the bore-hole itself, namely that of the vertical plane through the axis of the bore-hole. Since, from the survey, the position of this plane is known with respect to the points of the compass, it may be used as a reference. We therefore have the alternative procedure of insuring the proper positioning of a whipstock by causing a rotation of it until some instrument turning with it and sensitive to a definite location relative to that plane indicates the proper position. Such means is indicated in Figs. 12 and 13.

Referring first to Fig. 13, there is illustrated therein a casing 211 which may be included within the instrument illustrated in Fig. 1 in place of the instruments shown therein at 10 and 12. This casing will, of course, be fixed relative to the protective casing 8 in the same fashion as described above with reference to the gyroscopic instrument. Located within this casing are various pieces of apparatus indicated in Fig. 12 together with a variable condenser, shown at 210 in the diagram of Fig. 12 and in detail in Fig. 13. This condenser comprises an insulated carrier 212 which is pivoted about a horizontal axis by the use of pivoting members 214, the center of gravity of the condenser lying below this pivotal axis. The carrier 212 supports one or more fixed condenser plates 216 interleaved with rotating plates 218 carried by a shaft extending transversely of the axis determined by the pivots 214. Both the fixed and movable plates are preferably segmental, as indicated. To the movable plates there is secured a weighted bob 220. By the use of the arrangement of Fig. 13, it will be obvious that if the casing 211 lies within a sloping portion of the bore-hole and rotation ensues, the capacity of the condenser 210 will be a maximum or a minimum when the axis determined by the pivots 214 coincides with the vertical plane drawn through the axis of the bore-hole at that location. The maximum or minimum values of the capacity will occur 180° apart. One of them would determine definitely the azimuth of a given one of the pins 214 and hence definitely the azimuth of the whipstock, which would be initially fixed in position relative to the casing 211. It follows, therefore, that it is only necessary to give an indication of the attainment by the condenser of its minimum (or maximum) capacity to ascertain definitely the azimuthal position of the whipstock. Hereafter for clarity it will be assumed that maximum capacity of the condenser determines the proper orientation of the whipstock.

The condition of maximum capacity may be readily determined by arranging the condenser 210 as a variable impedance in the tank circuit of a vacuum tube oscillator. This variable frequency oscillator is indicated at 202 in Fig. 12. The output of the variable oscillator is fed into a fixed oscillator and mixer stage indicated at 204. A single tube may be provided in this stage together with a suitable oscillator circuit, which, during the use of the instrument, is adapted to produce oscillations of a given frequency. Adjustment of the frequency, however, is desirable to suit the conditions of use, this being accomplished by the setting of a variable impedance provided by a condenser or coil. A suitable tube for use in this stage would be, for example, a pentagrid converter of the type used as the first detector and oscillator in superheterodyne receiving circuits. The beat note produced in the stage 204 by the operation of the two oscillators and modulation may be amplified in the stage 206, which may contain one or more vacuum tubes in conventional design. The output of the amplifier is delivered to a speaker 208 arranged to produce a maximum sound which may be heard at the surface by conduction through the drill stem in the same fashion as the sounds from the apparatus heretofore indicated at 50.

The oscillations may be adjusted to produce an indication of the maximum capacity of the condenser 210 by various conditions of the beat note. If, for example, the fixed oscillator in 204 is arranged to produce a frequency which is just slightly higher than the lowest frequency which will occur when the maximum capacity of the condenser 210 is reached, then as the drill stem is rotated beat notes dropping to inaudible minima will occur twice in a single rotation of the drill stem at points equally closely spaced on opposite sides of the desired position. By proper adjustment of the parts, the attainment of the desired position will be indicated by a note of maximum pitch between the two points where inaudibility occurs by reason of the fact that both oscillators are operating at the same frequency. This is merely illustrative of one method of determining the maximum capacity, since adjustments may be readily made to secure other indications.

While only audible indication of the attainment of proper position has been discussed in connection with the last modification, it will be clear that the amplifier 206 may be used to control a relay which would effect automatic rotation of the whipstock or cessation of rotation at the proper time. It will be obvious that by the use of any arrangement of this sort the orientation of the whipstock in a completely surveyed well may be just as definitely fixed as if some means for directly indicating a fixed azimuth were provided. Instead of using a condenser as the variable impedance, a variable inductance could, of course, be used.

Instead of amplifying the beat note to directly produce a sound, the beat frequency current or the variable oscillator current may directly energize a suitable resonance circuit or the like to actuate a relay for closing the circuit through a horn such as previously described, whereby a very intense sound may be made without a high degree of amplification. It will be obvious that numerous arrangements well known to the art in the general operation of relays may be used for securing the desired indication of the correct setting of the whipstock.

It will be clear that numerous variations in the specific embodiments of the invention may be made without departing from its scope as defined in the following claims.

What we claim and desire to protect by Letters Patent is:

1. The method of orienting a whipstock within a bore hole including lowering the whipstock into the bore hole, there being lowered with the whipstock an instrument arranged to signal to the surface the attainment of a predetermined azimuthal position by the whipstock; causing the whipstock to assume such position; and fixing the whipstock in such position and a signal of the attainment of such position.

2. The method of orienting a whipstock within a bore hole including lowering the whipstock into the bore hole by means of a sectional drill stem, there being lowered with the whipstock an instrument arranged to signal to the surface the attainment of a predetermined azimuthal position by the whipstock; causing the whipstock to assume such position and a signal of the attainment of such position; and fixing the whipstock in such position.

3. The method of orienting a whipstock within a bore hole including lowering the whipstock into the bore hole by means of a sectional drill stem, there being lowered with the whipstock an instrument arranged to signal to the surface the attainment of a predetermined azimuthal position by the whipstock; causing the whipstock to assume such position and a signal of the attainment of such position by rotation of the drill stem at the surface; and fixing the whipstock in such position.

4. The method of orienting a whipstock within a bore hole including lowering the whipstock into the bore hole by means of a sectional drill stem, there being lowered with the whipstock a gyroscopic instrument arranged to signal to the surface the attainment of a predetermined azimuthal position by the whipstock; causing the whipstock to assume such position and a signal of the attainment of such position by rotation of the drill stem at the surface; and fixing the whipstock in such position.

5. Apparatus for orienting a whipstock including, in combination, a whipstock; means lowered with the whipstock and located thereabove adapted to indicate at the surface the attainment of a predetermined azimuthal position by the whipstock; and means for supporting the whipstock and indicating means.

6. Apparatus for orienting a whipstock including, in combination, a whipstock; means adapted to indicate at the surface the attainment of a predetermined azimuthal position by the whipstock; and means for supporting the whipstock and indicating means, said indicating means including a gyroscope.

7. Apparatus for orienting a whipstock including, in combination, a whipstock; means adapted to indicate at the surface the attainment of a predetermined azimuthal position by the whipstock; and means for supporting the whipstock and indicating means, said indicating means including an apparatus for recording the position of the whipstock.

8. Apparatus for orienting a whipstock including, in combination, a whipstock; means adapted to indicate at the surface the attainment of a predetermined azimuthal position by the whipstock; and means for supporting the whipstock and indicating means, said indicating means including a gyroscopic apparatus for recording the position of the whipstock.

9. Apparatus for orienting a whipstock including, in combination, a whipstock; means for supporting the whipstock; and means lowered with the whipstock and located thereabove for automatically causing the whipstock to assume a predetermined azimuthal position.

10. Apparatus for orienting a whipstock including, in combination, a whipstock; means for supporting the whipstock; and means lowered with the whipstock and located thereabove for causing the whipstock to assume a predetermined azimuthal position irrespective of the orientation of the supporting means.

11. Apparatus for orienting a whipstock including, in combination, a whipstock; means for supporting the whipstock; and means independent of surface control lowered with the whipstock and located thereabove for automatically arresting the whipstock in a predetermined azimuthal position.

12. Apparatus for orienting a whipstock including, in combination, a whipstock; means for supporting the whipstock; and means independent of surface control lowered with the whipstock and located thereabove for causing the whipstock to assume a predetermined azimuthal position.

13. Apparatus for orienting a whipstock including, in combination, a whipstock; means for supporting the whipstock; and gyroscopically controlled means for causing the whipstock to assume a predetermined azimuthal position.

14. Apparatus for orienting a whipstock including, in combination, a whipstock; means for supporting the whipstock; means for automatically causing the whipstock to assume a predetermined azimuthal position; and means lowered with the whipstock for recording the attainment of such position by the whipstock.

15. Apparatus for orienting a whipstock including, in combination, a whipstock; means for supporting the whipstock; means for automatically causing the whipstock to assume a predetermined azimuthal position; and means lowered with the whipstock for photographically recording the attainment of such position by the whipstock.

16. Apparatus for orienting a whipstock including, in combination, a whipstock; means for supporting the whipstock; means for automatically causing the whipstock to assume a predetermined azimuthal position; and means lowered with the whipstock for indicating at the surface the attainment of such position.

17. Apparatus for orienting a whipstock including, in combination, a whipstock; means for supporting the whipstock; means for automatically causing the whipstock to assume a predetermined azimuthal position; means lowered with the whipstock for recording the attainment of such position by the whipstock; and means for indicating at the surface the attainment of such position.

18. Apparatus for orienting a whipstock including, in combination, a whipstock; means for supporting and rotating the whipstock; and means lowered with the whipstock and located thereabove for automatically discontinuing rotation of the whipstock when it assumes a predetermined azimuthal position.

19. Apparatus for orienting a whipstock including, in combination, a whipstock; means for supporting and rotating the whipstock; means lowered with the whipstock and located thereabove for automatically discontinuing rotation of the whipstock when it assumes a predetermined azimuthal position; and means arranged to indicate at the surface the attainment of such position.

20. Apparatus for orienting a whipstock including, in combination, a whipstock; means for supporting and rotating the whipstock; means lowered with the whipstock and located thereabove for automatically discontinuing rotation of the whipstock when it assumes a predetermined azimuthal position; and means for making a record of the position of the whipstock.

21. Apparatus for orienting a whipstock including, in combination, a whipstock; means for supporting and rotating the whipstock; means lowered with the whipstock and located thereabove for automatically discontinuing rotation of the whipstock when it assumes a predetermined azimuthal position; means for making a record of the position of the whipstock; and means arranged to indicate at the surface the attainment of such predetermined position.

22. Apparatus for orienting a whipstock including, in combination, a whipstock; means for supporting and rotating the whipstock; and means located above the whipstock for automatically discontinuing rotation of the whipstock when it assumes a predetermined azimuthal position.

23. Apparatus for orienting a whipstock including, in combination, a whipstock; means for supporting and rotating the whipstock; means located above the whipstock for automatically discontinuing rotation of the whipstock when it assumes a predetermined azimuthal position; and means lowered with the whipstock and araranged to indicate at the surface the attainment of such position.

24. In combination, a whipstock; means for supporting the whipstock within a bore-hole; and means lowered with the whipstock for causing the whipstock to assume a predetermined azimuthal position in the bore-hole irrespective of the position of its supporting means.

25. In combination, a whipstock; a sectional drill stem; a swivel connection between the whipstock and drill stem whereby the whipstock may rotate relatively to the drill stem; and means lowered with the whipstock for causing the whipstock to assume a predetermined azimuthal position in a bore-hole when suspended by the drill stem irrespective of the position of the drill stem.

26. In combination, a whipstock; means for supporting the whipstock within a bore-hole; and means located adjacent the whipstock for signalling to the surface the attainment of a predetermined azimuthal position by the whipstock.

27. In combination, a whipstock; means for supporting the whipstock within a bore-hole; and gyroscopically controlled means located adjacent the whipstock for signalling to the surface the attainment of a predetermined azimuthal position by the whipstock.

28. In combination, a whipstock; a sectional drill stem supporting said whipstock; and means located adjacent the whipstock for signalling to the surface the attainment of a predetermined azimuthal position by the whipstock.

29. In combination, a whipstock; means for supporting the whipstock within a bore hole; means for causing the whipstock to assume a predetermined azimuthal position in the bore-hole irrespective of the position of its supporting means; and means located adjacent the whipstock for signalling to the surface the attainment of a predetermined position by the whipstock.

30. In combination, a whipstock; means for supporting the whipstock within a bore-hole; and means located adjacent the whipstock for signalling to the surface the attainment of a predetermined azimuthal position by the whipstock and for making a record of the position of the whipstock.

31. In combination, a whipstock; a sectional drill stem supporting said whipstock; and means located adjacent the whipstock for signalling to the surface the attainment of a predetermined azimuthal position by the whipstock and for making a record of the position of the whipstock.

32. In combination, a whipstock; means for supporting the whipstock within a bore-hole; means for causing the whipstock to assume a predetermined azimuthal position in the bore-hole irrespective of the position of the supporting means; and means for making a record of the position of the whipstock.

33. The method of orienting a whipstock within a bore-hole including lowering the whipstock into the bore-hole by means of a sectional drill stem, determining the azimuthal position of the whipstock while it is still attached to the drill stem by means of an instrument bearing a known relationship to the whipstock, and fixing the whipstock in position.

ARTHUR B. PALMER.
GOTTDANK L. KOTHNY.

CERTIFICATE OF CORRECTION.

Patent No. 2,012,138. August 20, 1935.

ARTHUR B. PALMER, ET AL.

It is hereby certified that error appears in the printed specification of the above numbered patent requiring correction as follows: Page 7, first column, line 17, claim 1, strike out the words "and a signal of the attainment of such position" and insert the same after "position" and before the semicolon, line 16, same claim; and that the said Letters Patent should be read with these corrections therein that the same may conform to the record of the case in the Patent Office.

Signed and sealed this 14th day of April, A. D. 1936.

Leslie Frazer (Seal)

Acting Commissioner of Patents.

DISCLAIMER 2,012,138.—*Arthur B. Palmer*, Dallas, Tex., and *Gottdank L. Kothny*, Strafford, Pa. METHOD AND APPARATUS FOR ORIENTING WHIPSTOCKS. Patent dated August 20, 1935. Disclaimer filed December 29, 1942, by the assignee, *Sperry-Sun Well Surveying Company*.

Hereby enters this disclaimer to claim 33 of said Letters Patent.

[*Official Gazette January 26, 1943.*]